United States Patent
Longo et al.

(10) Patent No.: US 8,600,566 B1
(45) Date of Patent: Dec. 3, 2013

(54) THERMAL MANAGEMENT SMART VALVE WITH RUPTURE DETECTION AND ISOLATION

(75) Inventors: Donald R. Longo, Pittsgrove, PA (US); Donald D. Dalessandro, Williamstown, NJ (US); Qing Dong, Birdsboro, PA (US); Frank T. Ferrese, Haddon Heights, PA (US); John M. Roach, Herriman, UT (US); Michael G. Zink, Marlton, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 284 days.

(21) Appl. No.: 13/021,580

(22) Filed: Feb. 4, 2011

(51) Int. Cl.
*G05D 7/00* (2006.01)

(52) U.S. Cl.
USPC ............................................ 700/282; 700/300

(58) Field of Classification Search
USPC .............. 700/275, 282, 285, 301; 702/50, 51, 702/138
See application file for complete search history.

(56) References Cited

U.S. PATENT DOCUMENTS 5,228,469 A * 7/1993 Otten et al. ..................... 137/80
6,535,827 B1 3/2003 Lestina et al.
7,306,008 B2 12/2007 Tornay

OTHER PUBLICATIONS

Don Dalessandro and Leslie Spaulding, "Autonomic Fire Suppression System," Seaframe, 2008, vol. 4, Issue 1, Carderock Division Publication, Naval Surface Warfare Center, West Bethesda, Maryland.

Joseph McGillian, Thomas Perotti, Edward McCunney, Michael McGovern, "Thermal Management Control Systems," ASNE, Paper, Automation and Controls 2010 Proceedings, Aug. 10-11, 2010, Milwaukee, Wisconsin.

Joseph McGillian, Thomas Perotti, Edward McCunney, Michael McGovern, "Thermal Management Control Systems," ASNE, Presentation, Automation and Controls 2010 Proceedings, Aug. 10-11, 2010, Milwaukee, Wisconsin.

Ryan Downs, MPR Associates, "Design, Development and Deployment of Automated Distributed Control Systems on Active Navy Surface Combatants," American Society of Naval Engineers (ASNE), Automation and Controls (ACS) 2007 Proceedings, Bitoxi, Mississippi, Dec. 10-11, 2007, 13 pages, available online on MPR website, www.mpr.com/.

* cited by examiner

*Primary Examiner* — Carlos Ortiz Rodriguez
(74) *Attorney, Agent, or Firm* — Howard Kaiser (57) ABSTRACT

The condition of a fluid piping system is monitored by multiple intercommunicative smart valves, each executing a computer algorithm that designates smart valves as critical or non-critical, compares measurement data versus simulation data, and makes decisions based on the critical-or-noncritical designations and the measurement-versus-simulation comparisons. Initial measurement-versus-simulation comparisons are made for downstream pressure, flow rate, and temperature. If a measurement-versus-simulation discrepancy is found in either the downstream pressure or the flow rate, then the algorithm compares a measurement rupture determinant versus a simulation rupture determinant; if a measurement-versus-simulation discrepancy is found in the rupture determinant, then the smart valve is closed. If a measurement-versus-simulation discrepancy is found in the temperature, then the smart valve, if non-critical, is closed; however, if the smart valve is critical, then the nearest upstream non-critical smart valve is closed. Any measurement-versus-simulation discrepancy results, at least, in an alarm or warning.

14 Claims, 8 Drawing Sheets

THERMAL MANAGEMENT SMART VALVE WITH RUPTURE DETECTION AND ISOLATION

BACKGROUND OF THE INVENTION

The present invention relates to fluid conduction and fluid systems, more particularly to monitoring and controlling (regulating) fluid systems to detect and respond to failures such as pipe ruptures in the fluid systems.

The United States Navy has developed electrically actuated valves and computer programming algorithms for effecting piping rupture detection. According to this Navy-developed technology, a "smart valve" measures differential fluid pressure across a valve in order to detect a pipe rupture. The Navy is implementing this pressure-based smart valve technology in the DDG-1000 and CG(X) classes of ships as part of a fire damage control system. See Donald D. Dalessandro and Leslie Spaulding, "Autonomic Fire Suppression System, "*Seaframe*, Naval Surface Warfare Center, Carderock Division, Volume 4, Issue 1, 2008, hereby incorporated herein by reference. See also, Lestina et al., U.S. Pat. No. 6,535,827 B1, issue date 18 Mar. 2003, entitled "Method and Apparatus for Detecting and Isolating a Rupture in Fluid Distribution System," hereby incorporated herein by reference.

Many ships use fluid systems to cool engines and other machinery. Cooling systems are also prevalent in industry. The Navy's traditional approach to monitoring and damage control of shipboard cooling systems (e.g., chilled water systems) has involved manual operation by ship personnel. During normal operations, the engineering department of the ship monitors cooling system thermal load level, and aligns the fluid system using local manual or manual remote actuated valves to predetermined configurations developed during the cooling system design. Damage control is performed manually either locally or from a remote control station.

Thus, customarily it is incumbent upon a ship's crew to perform thermal balancing of the cooling system following a breakdown or mishap in the cooling system. However, there are drawbacks to this human intervention-based strategy. Cooling system damage scenarios may demand significant time and commitment from ship personnel, and may pose extreme dangers to the personnel. Furthermore, the personnel may be limited in their ability to realign a damaged cooling system so that cooling remains available to mission-critical equipment.

SUMMARY OF THE INVENTION

In view of the foregoing, it is an object of the present invention to provide an improved methodology for monitoring a cooling system and for exercising damage control upon the occurrence of a detrimental (e.g., damaging, destructive, or injurious) event.

According to typical practice of the present invention, a smart valvular unit is suitable for use in a fluid system. The present invention's smart valvular unit comprises a valve, a fluid temperature sensor, an inlet fluid pressure sensor, an outlet fluid pressure sensor, and a computer. The computer is for processing sensing performed by the fluid temperature sensor, the inlet fluid pressure sensor, and the outlet fluid pressure sensor. The computer is configured to execute computer program logic that, when executed, is capable of: (i) detecting an anomalous circumstance based on comparison between a sensory-derived value and a corresponding predicted value; and, (ii) initiating activity responsive to the detected anomalous circumstance.

According to the present invention's computer program logic: (a) if a sensory-derived value for outlet fluid pressure or flow rate or fluid temperature does not match a corresponding predicted value, then information of such non-matching is conveyed elsewhere by the smart valvular unit; (b) if a sensory-derived value for outlet fluid pressure or flow rate does not match a corresponding predicted value, and a sensory-derived value for rupture determinant does not match a corresponding predicted value, then the valve of the smart valvular unit is closed; (c) if a sensory-derived value for fluid temperature does not match a corresponding predicted value, and the valve of the smart valvular unit is non-critical, then the valve of the smart valvular unit is closed; (d) if a sensory-derived value for fluid temperature does not match a corresponding predicted value, and the valve of the smart valvular unit is critical, then at least one valve external to the smart valvular unit is closed, wherein the at least one valve external to the smart valvular unit includes the nearest upstream non-critical valve external to the smart valvular unit.

The present invention, as typically practiced, affords the ability to monitor pressure and temperature of cooling liquids (such as relatively low temperature water) in order to control device levels of a cooling system during both normal operations and damage-control operations. The present invention can be embodied, for instance, as a computer, a computer program product, a method, a smart valvular device, or a networked fluid-cooling system. Typical inventive embodiments provide monitored data to an autonomous device level network and/or a supervisory control system. The present invention's thermal smart valve incorporates smart valve technology that was previously developed by the Navy, namely, a smart valvular device that measures differential fluid pressure across a valve to detect pipe rupture. Terms such as "thermal smart valve," "smart valvular unit," and "smart valvular device" are synonymously used herein to refer to many embodiments of the present invention.

As typically embodied, the present invention's thermal smart valve represents a unique valvular unit that combines a temperature-sensing component and two pressure-sensing components with a processor for executing the present invention's control logic, and that has the capability of wiredly and/or wirelessly interfacing with a network. A typical inventive thermal smart valve includes a valve body, an electric actuator, two valve-integral pressure transducers (one upstream, the other downstream), a valve-integral temperature sensor (e.g., upstream or downstream), a microprocessor, and one or more network interface cards (e.g., at least one wired network interface card and/or at least one wireless network interface card).

According to typical inventive practice, the measurements taken by the two pressure sensors and the temperature sensor are used by the inventive thermal smart valve to perform pipe rupture detection. A dominant theme of typical inventive algorithmic reasoning is the rendering of comparisons between empirical data (sensed data, or data calculated from sensed data) and expected data (model data) in order to decide what to do next. An actual temperature is compared with an expected temperature; if the actual temperature is outside the expected temperature range, then the inventive algorithmic reasoning decides what action to take based on consideration of the criticality (e.g., critical versus non-critical) of the valve. An actual downstream pressure is compared with an expected downstream pressure, and an actual flow rate (calculated from the actual upstream pressure and the actual downstream pressure) is compared with an expected flow rate; if the actual downstream pressure is outside the expected pressure range, and/or the actual flow rate is outside the expected flow rate range, then the inventive algorithmic reasoning decides what action to take based on consideration of whether the actual downstream pressure and the actual flow rate meet the rupture criterion established by the inventive algorithm.

Typical applications of the inventive thermal smart valve provide for installation thereof in the supply-side piping of a closed-loop cooling system. A temperature sensor is embedded in the valve body to monitor the fluid temperature passing through the valve. A pair of pressure sensors is embedded in the valve body—in the inlet and the outlet, respectively, of the valve—to monitor flow through the valve. According to typical inventive practice, upon installation of the inventive thermal smart valve in the cooling system, expected/predicted values (e.g., value ranges) of the following parameters are set (e.g., programmed) in the inventive thermal smart valve's control software: operating pressure envelope; operating temperature envelope; material condition (W, Z, etc.); and, vital load versus non-vital load. A predictive value range is typically based on a predictive value (e.g., "x"), and a tolerable deviation higher or lower than (e.g., plus-or-minus, or "x±Δx") the predictive value.

The present invention's thermal smart valves and device-level thermal balancing relieve a ship's crew from performing thermal balancing of the cooling system, following a casualty. Association of inventive thermal smart valves with a cooling system serves to improve the realignment of a cooling system and to improve the availability of cooling to mission-critical equipment, after the cooling system has been damaged. Further, inventive thermal smart valves permit distributed monitoring of a cooling system's performance without installation of additional sensors and replacement of traditionally installed sensors.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 5 is a more complete rendition of either of the schematics shown in FIG. 3 and FIG. 4. For illustrative purposes, only supply-side piping and valves are shown in FIG. 3 and FIG. 4. FIG. 5 shows supply-side piping and valves, and return-side piping and valves. The dashed rectangle in FIG. 5 can be understood to represent either wired or wireless communication networking.

DESCRIPTION OF EXEMPLARY EMBODIMENTS OF THE INVENTION

Figure 1:
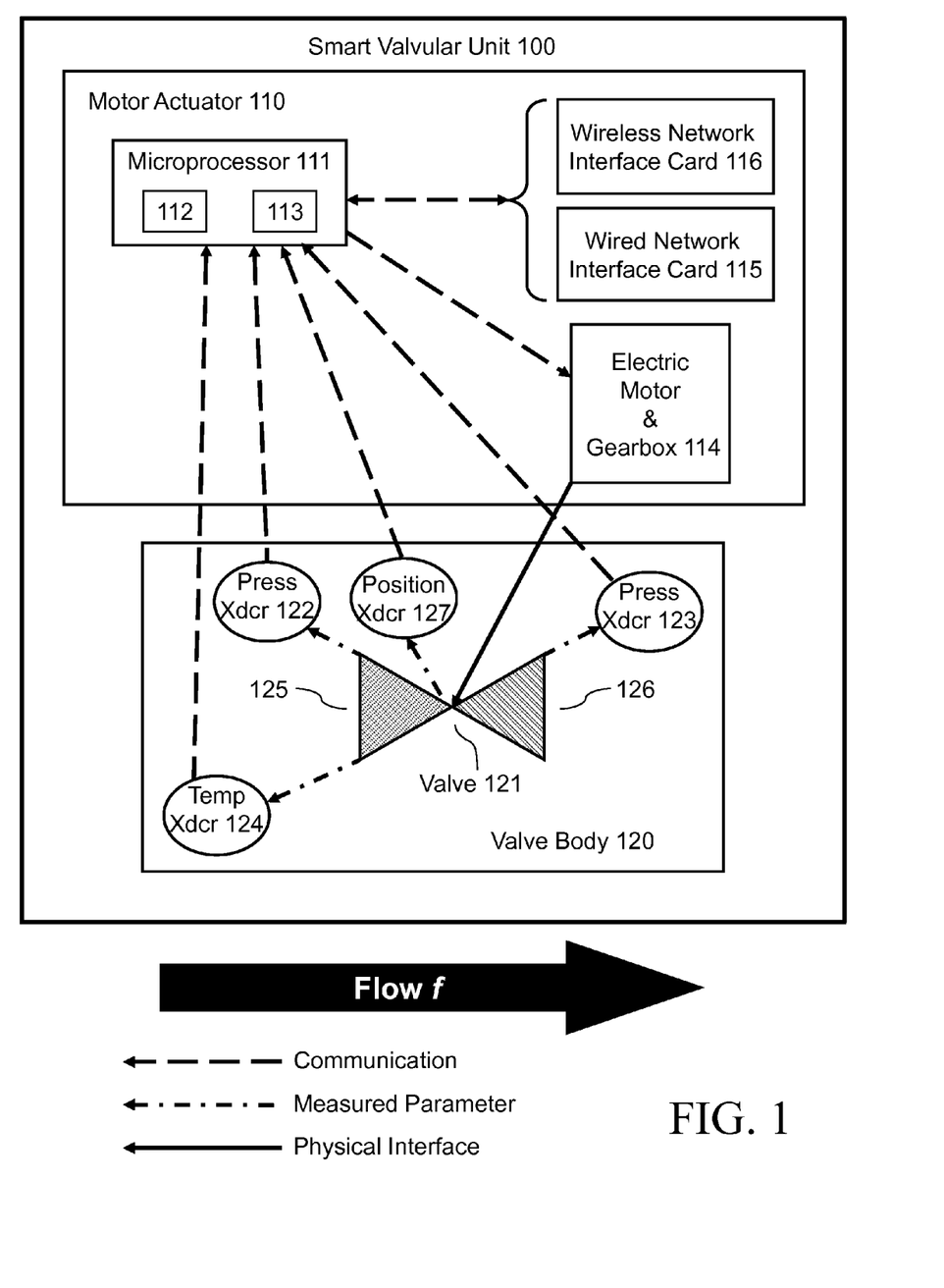
FIG. 1 is a schematic of an embodiment of a thermal smart valve in accordance with the present invention.

Referring now to FIG. 1, the present invention's inventive valvular unit 100 has two basic components, viz., a motor actuator component 110 and a valve body component 120. Inventive valvular unit 100 includes the following constituents of the motor actuator component 110: a computer (e.g., microprocessor) 111, which includes a processor 112 and a memory 113); a valve actuator (e.g., an electric motor-and-gearbox apparatus) 114; a wired network interface card 115 (for wired communication between inventive valvular unit 100 and other devices in a wired network); and, a wireless network interface card 116 (for wireless communication between inventive valvular unit 100 and other devices in a wireless network). Inventive valvular unit 100 further includes the following constituents of the valve body component 120: a two-way valve 121; water inlet pressure sensor 122; water outlet (discharge) pressure sensor 123; water temperature sensor 124; and, valve position sensor 127.

As shown in FIG. 1, the water flow f is in the direction from left to right, entering inventive valvular unit 100 at its valve inlet 125 and exiting valvular unit 100 at its valve outlet 126. According to typical inventive practice, water pressure sensors 122 and 123 are pressure transducers, and water temperature sensor is a temperature transducer. Examples of valve position sensor 127 include potentiometer sensor and position transducer. Inlet water pressure sensor 122 and water temperature sensor 124 are each integrated with valve 121 at or near the valve inlet 125. Outlet water pressure sensor 123 is integrated with valve 121 at or near the valve outlet 126.

Onboard processing and storage are performed by a computer (such as a microprocessor) 111, which has an inventive computer program product resident in a non-volatile portion of its memory 113, and executes (via processor 112) the stored inventive control logic. Computer 111 accordingly acts, inter alia, as the controller of valve 121, and has capabilities including the following: receiving and processing electrical data signals from inlet pressure sensor 122, outlet pressure sensor 123, temperature sensor 124, and valve position sensor 127; transmitting electrical control signals to valve actuator 114; and, transmitting electrical communication signals to, and receiving electrical communication signals from, a wired network (e.g., via wireless network interface card 115) and/or a wireless network (e.g., via wireless network interface card 116). Valve actuator 114 serves to actuate (e.g., open) or de-actuate (e.g., close) valve 121 when valve actuator 114 is instructed to do so by computer 111.

Figure 2:
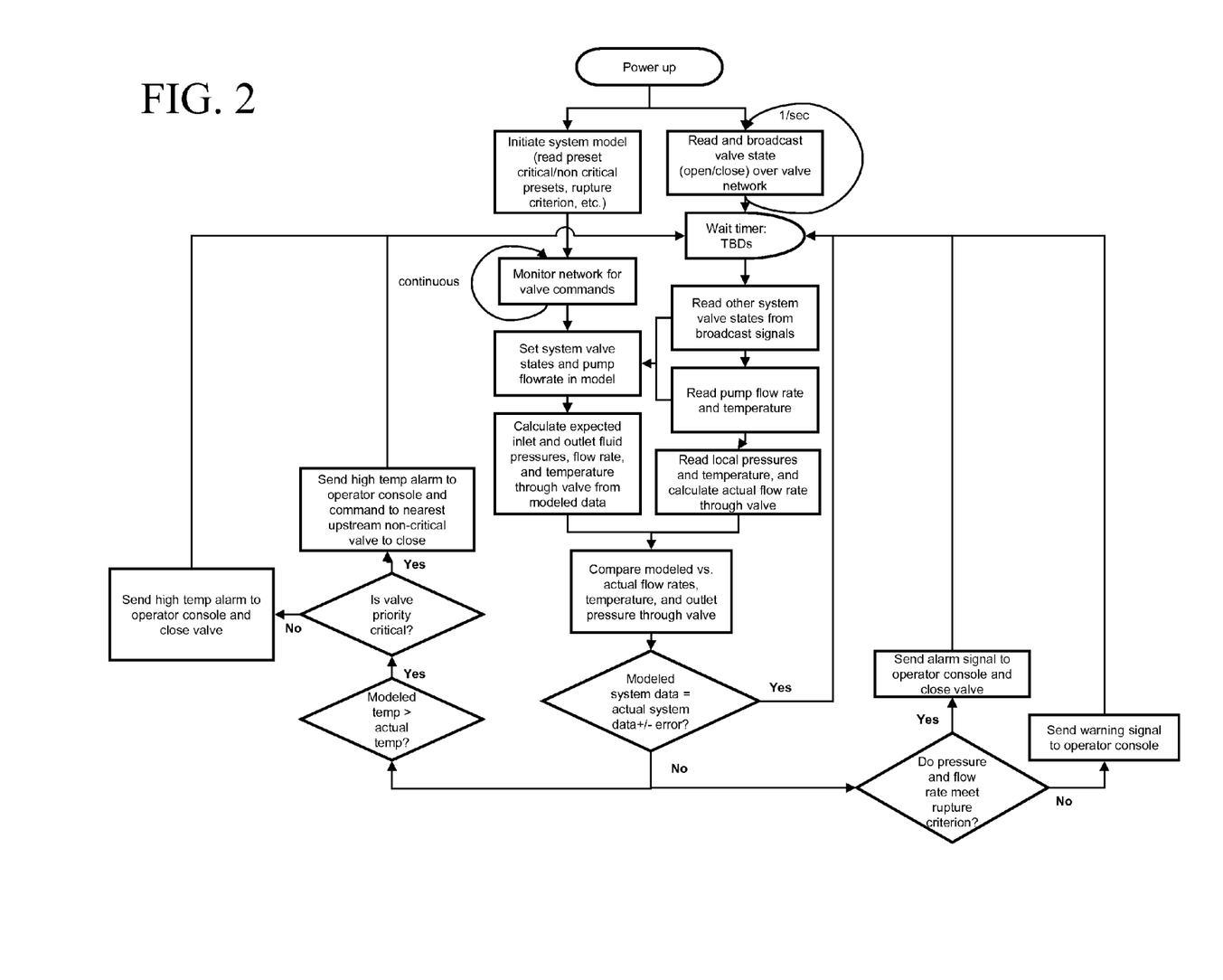
FIG. 2 is a flow diagram of an embodiment of an inventive thermal smart valve's control logic in accordance with the present invention.
Figure 2A:
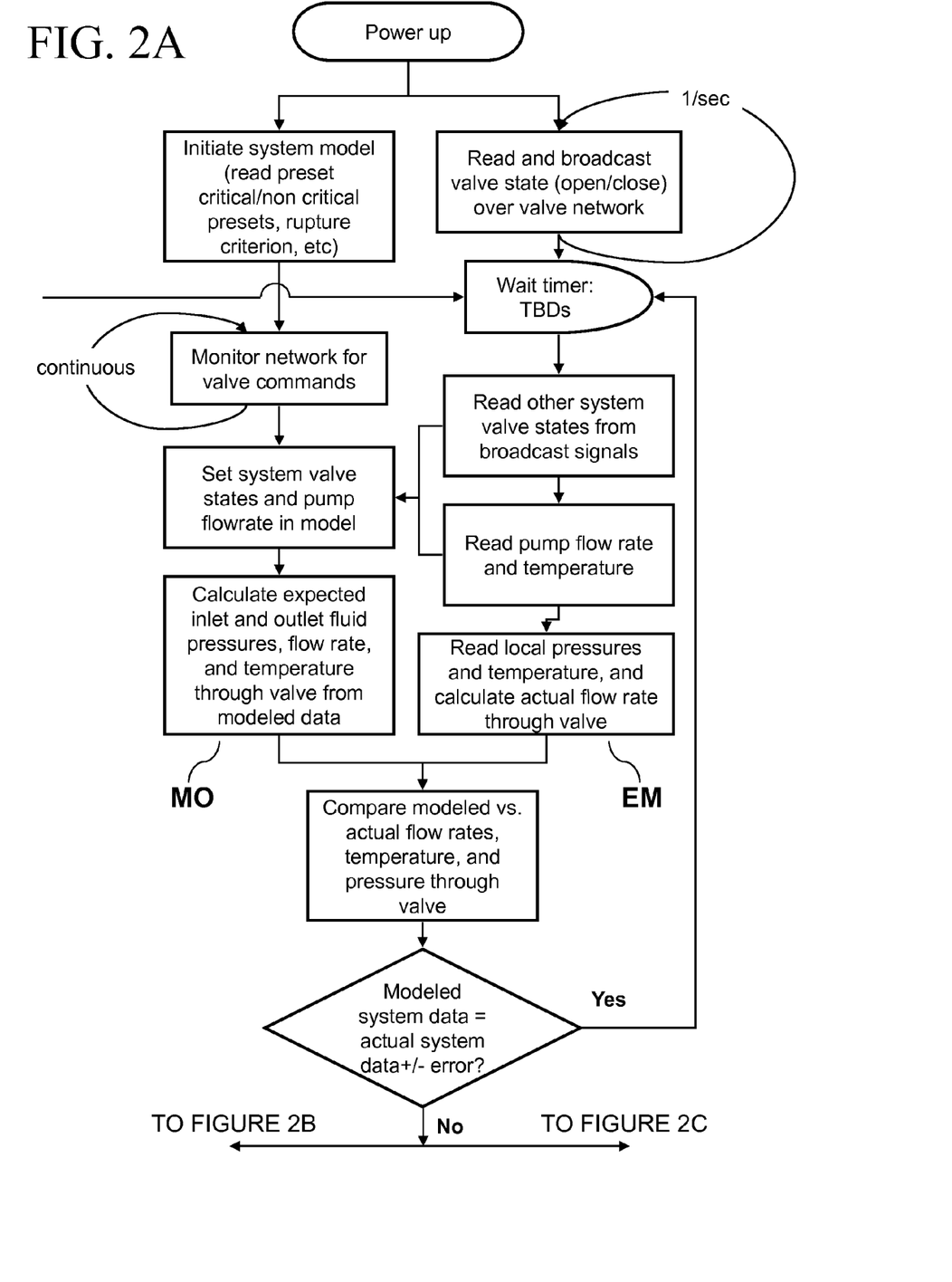
FIG. 2A, FIG. 2B, and FIG. 2C are partial and enlarged renditions of FIG. 2. The middle, left-hand, and right-hand sections of FIG. 2 are shown by FIG. 2A, FIG. 2B, and FIG. 2C, respectively.
Figure 2B:
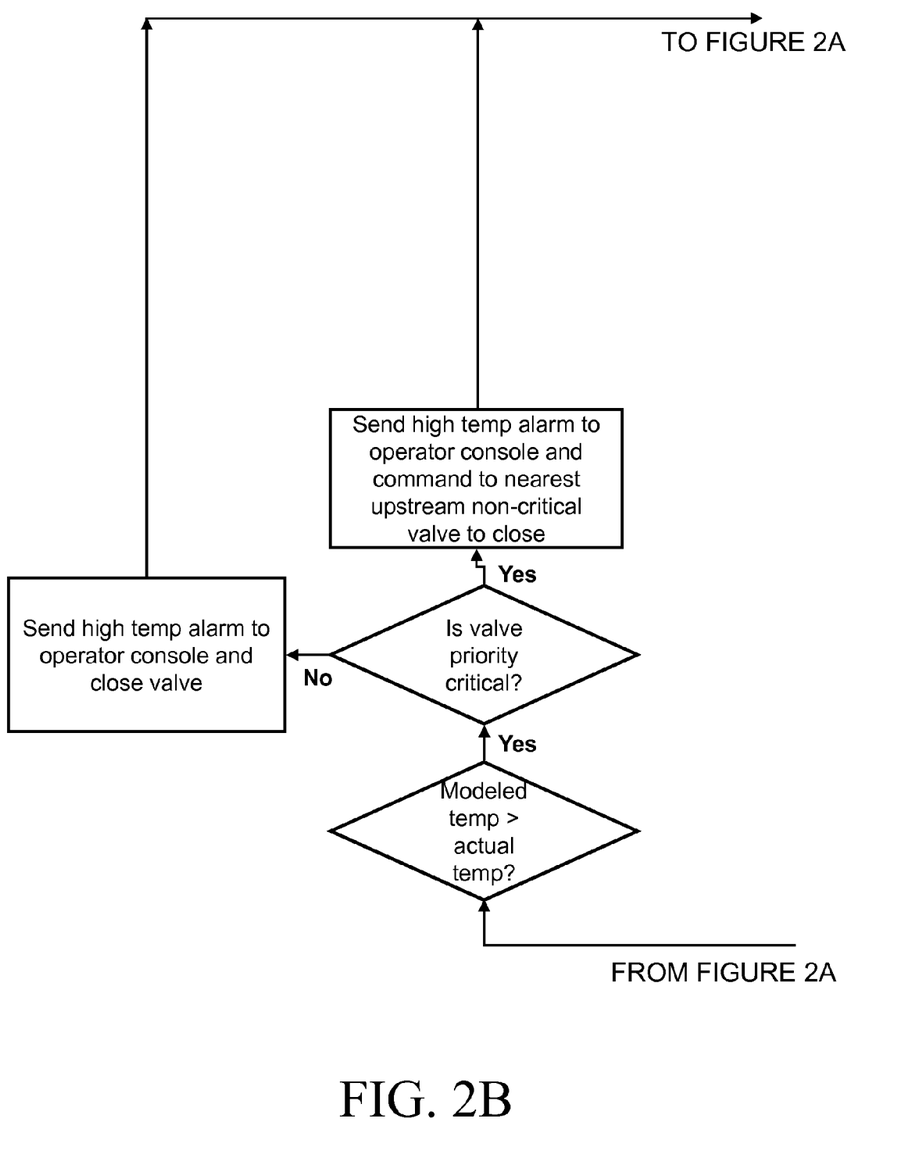
Figure 2C:
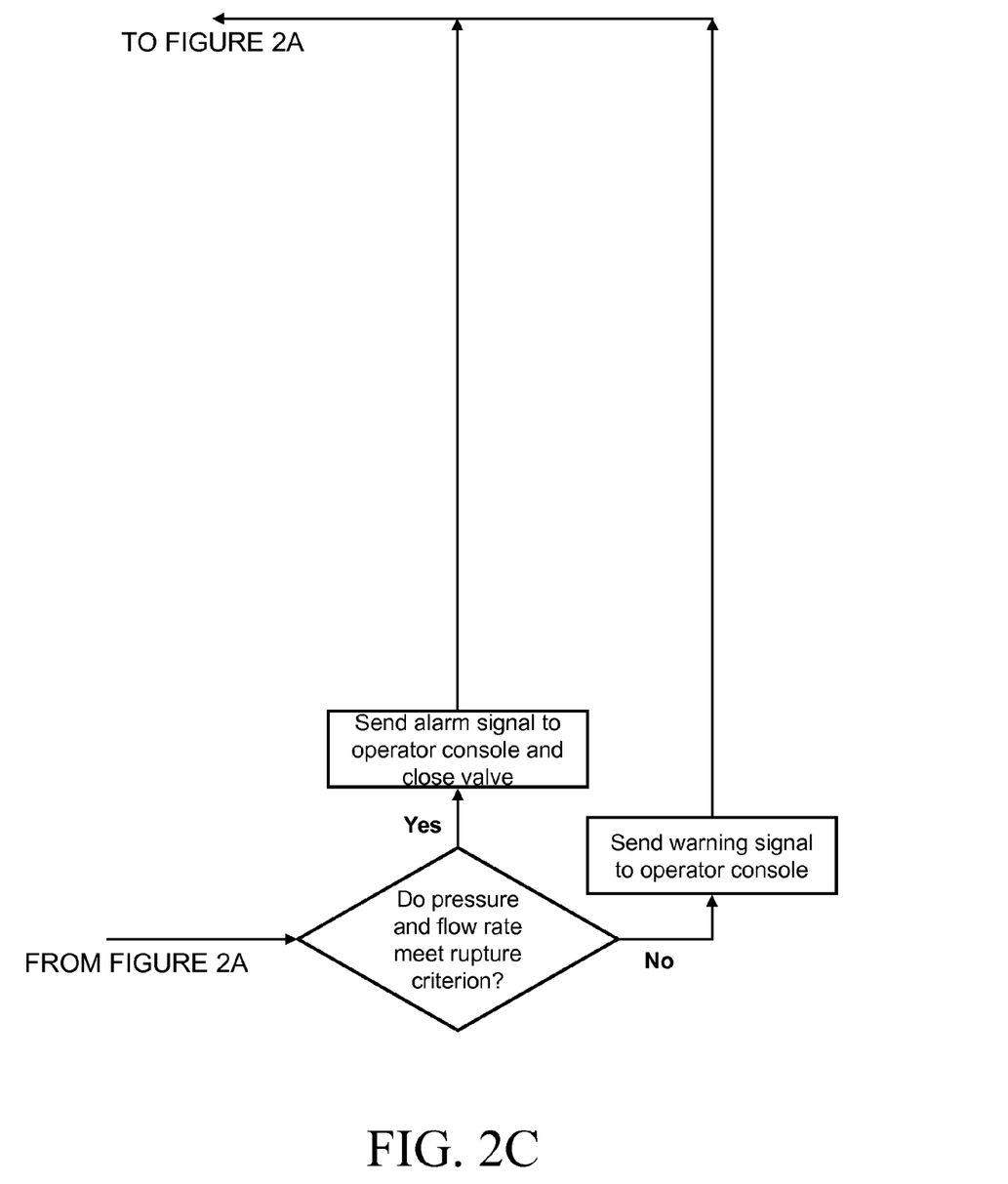
Figure 3:
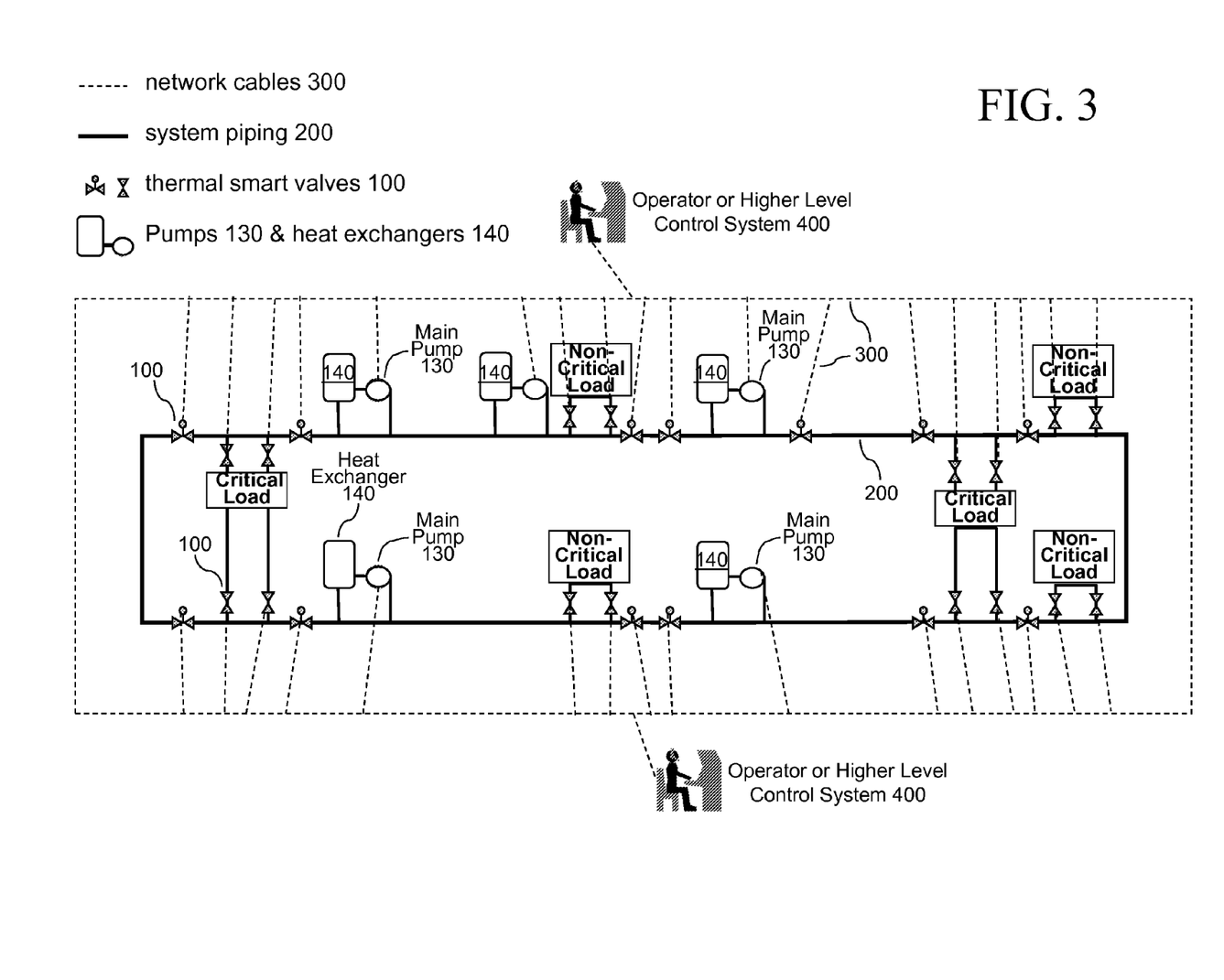
FIG. 3 is a schematic of an embodiment of a networked fluid-cooling system in accordance with the present invention. The inventive system including piping, inventive thermal smart valves, and wired network communication capability.
Figure 4:
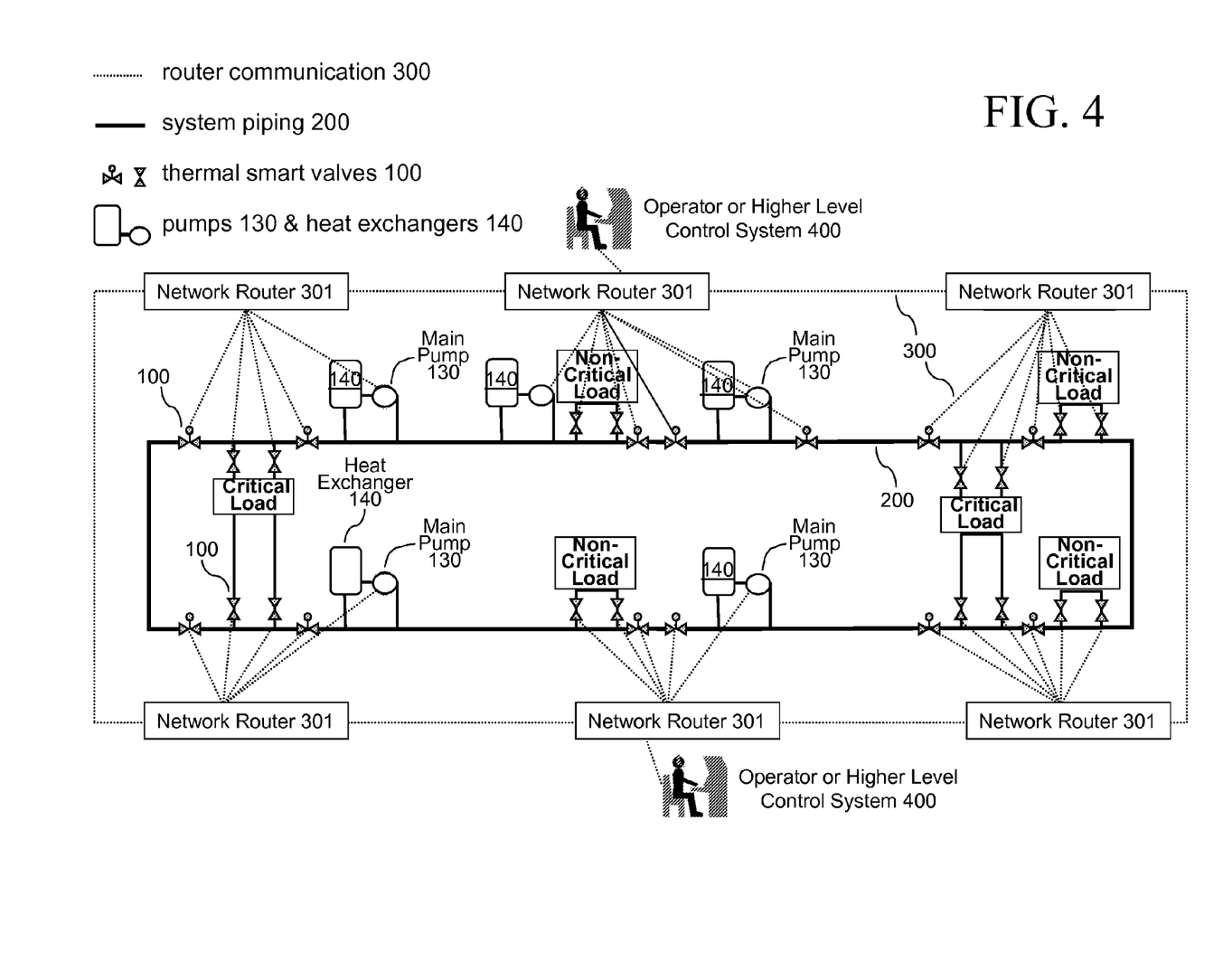
FIG. 4 is a schematic, similar to that shown in FIG. 3, of an inventive embodiment similar to that shown in FIG. 3. As distinguished from the inventive system shown in FIG. 3, the inventive system shown in FIG. 4 has wireless network communication capability.
Figure 5:
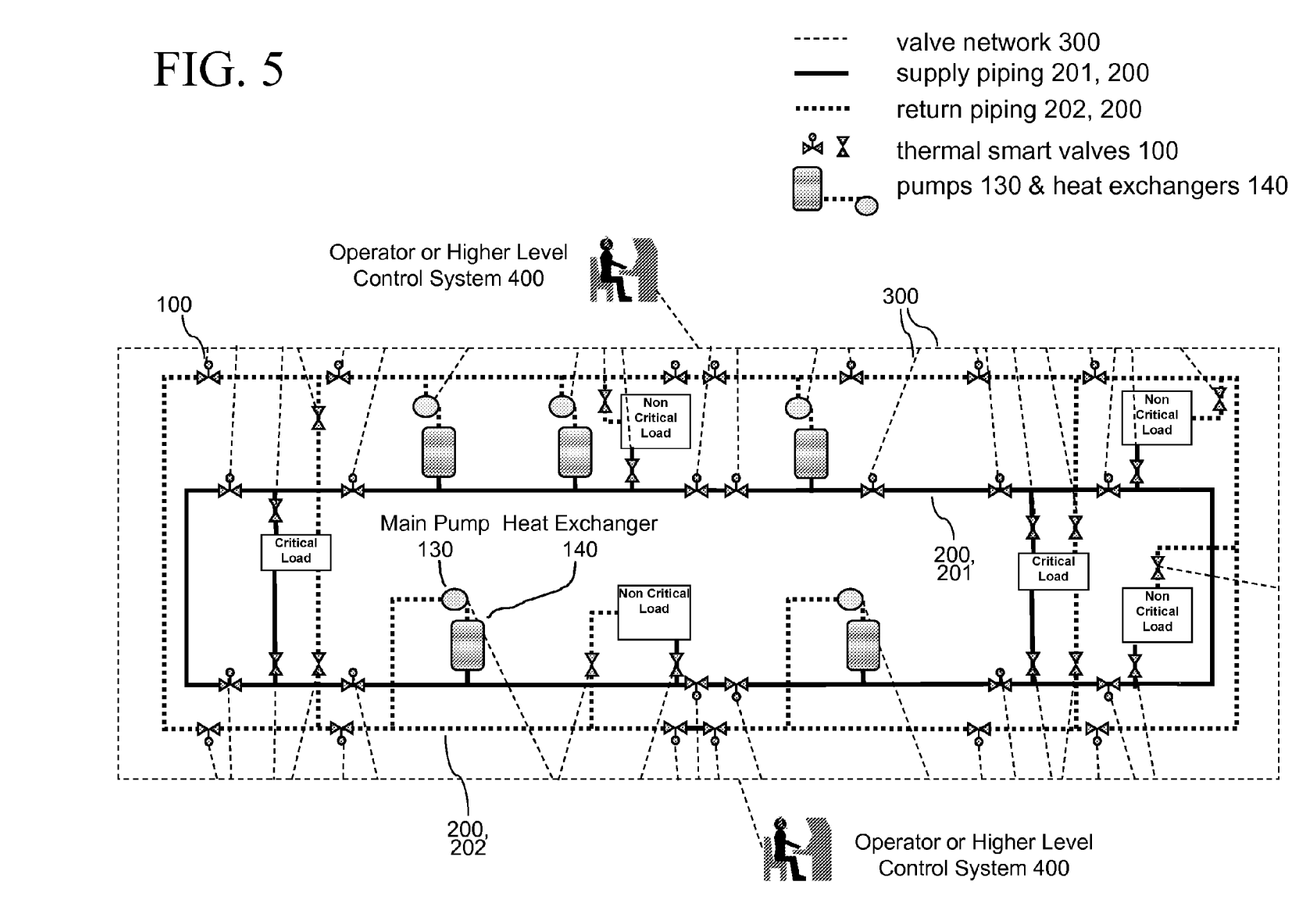

Reference is still made to FIG. 1 and also made to FIG. 2 through FIG. 5. FIG. 2, FIG. 2A, FIG. 2B, and FIG. 2C illustrate an inventive embodiment of computer control logic. FIG. 3, FIG. 4, and FIG. 5 respectively illustrate inventive embodiments of a networked fluid-cooling piping system. Inventive valvular unit 110's computer 111 hosts algorithmic computer programming/software including the following: hydraulic resistance rupture-detection logic, for detecting and isolating piping damage; a model of the fluid-cooling (e.g., water-cooling) system of which the inventive valvular unit is a part; and, operation-and-position logic, for determine operating condition of the fluid-cooling system local to the inventive valvular unit 110, and for determining inventive valvular unit 110's valve 121 position based on inventive valvular unit 110's material condition. The inventive valvular unit 110 is capable of communicating, over an IT network, information including inventive valvular unit 110's valve 121 position and measured temperature, as well as the detection of a piping rupture.

During normal operation of the cooling system, the inventive thermal smart valve 100 operates in the manner of a conventional valve such as a conventional motor-operated electric valve 121. Otherwise expressed, in the absence of inventively determined abnormality, inventive smart valve 100 permits its valve 121 to function in a traditional way. However, when operation of the cooling system manifests abnormality, the inventive thermal smart valve 100 operates in a unique manner to react quickly to the abnormality so that operation of the cooling system may be sustained at as normal a level as possible. Following a casualty, a piping rupture is detected by an inventive thermal smart valve 100 via either (i) the inventive thermal smart valve 100's pair of pressure transducers 122 and 123, or (ii) the inventive thermal smart valve 100's temperature transducer 124, or (iii) both (i) and (ii).

Prior to operation of smart valvular unit 100, the valve controller, viz., computer 111, is assigned the following values: a "criticality," in terms of critical load versus non-critical load; a rupture criterion; high and/or low flow limit(s); and, a high temperature limit. In addition, if computer 11 is set as a critical load, then upstream non-critical loads are identified. To begin operation of smart valvular unit 100, power is applied to computer 111, which thus powers up. As each figure among FIG. 3 through FIG. 5 illustrates, a networked fluid-cooling system 1000 in accordance with the present invention includes a fluid-cooling (e.g., water-cooling) piping system 200 and a communication network 300. FIG. 3 through FIG. 5 each similarly illustrate functional connections of system components forming a network for permitting signals to be broadcast and monitored by all computers 111 (valve controllers), pump 130 controllers, and operator consoles 140.

Computer 111, approximately simultaneously with its power-up, starts a real-time physics-based computer model of the fluid-cooling piping system 200, which is stored in a non-volatile portion of memory 113. Computer 111 reads its position from installed valve-position sensor (e.g., potentiometer) 127, and broadcasts the valve position over the network 300. The present invention's computer algorithm continues to run and to monitor for system-component state-changes (e.g., pump 130 energizing, valve 121 closure, etc.). After computer 111 broadcasts its state, a timer starts and expires at a predetermined time. Upon expiration of the timer, computer 111 reads the state signals broadcast from other components (e.g., other inventive valvular units 100) of the inventive networked fluid-cooling system 1000. Computer 111 reports these states to the computer algorithm in its memory 112, and the computer algorithm accordingly updates any state changes.

Computer 111 then reads its local physical characteristics (inlet pressure, outlet pressure, and temperature), and calculates flow rate through the associated valve 121. The empirical (measured, or measured and calculated) characteristics are compared to the corresponding values in the model (simulation). The terms "model" and "simulation" are used interchangeably herein. If the empirical values are within the modeled error bands (e.g., value+/−an accepted error) for all three physical characteristics (viz., inlet pressure, outlet pressure, and temperature), then the inventive control logic restarts the timer and continues the loop. However, if one or more of the empirical values falls outside the modeled error band (e.g., value+/− accepted error), then further algorithmic inquiries and actions are performed, as elaborated upon hereinbelow.

According to typical inventive algorithmic practice, in each inventive valvular unit 100 the three fluid-related physical characteristics whose empirical (actual) values are compared to model (predictive) values are outlet pressure, flow rate, and temperature. Empirical determination of these three physical characteristics is represented by the box indicated as "EM" in FIG. 2A. Model determination of these three physical characteristics is represented by the box indicated as "MO" in FIG. 2A. The "inlet" pressure and the "outlet" pressure are synonymously referred to herein as the "upstream" pressure and the "downstream" pressure, respectively.

The empirical inlet (upstream) pressure is the fluid pressure as measured by valve inlet pressure sensor 122. The empirical outlet (downstream) pressure is the fluid pressure as measured by valve outlet pressure sensor 123. The empirical temperature is the fluid temperature as measured by temperature sensor 124. The empirical flow rate is calculated by the inventive algorithm using the empirical inlet pressure and the empirical outlet pressure, according to a formula such as the following:

$$Q = C_v \sqrt{(P_{inlet} - P_{outlet})/S}, \quad (1)$$

where $P_{inlet}$ is the inlet pressure of the fluid, measured by inlet pressure sensor 122; $P_{outlet}$ is the outlet pressure of the fluid, measured by outlet pressure sensor 123; $C_v$ is the valve flow coefficient; Q is the volumetric flow rate of the fluid; and, S is the specific gravity of the fluid. Note that if the specific gravity S equals one (such as the specific gravity characterizing pure water), then Equation (1) simplifies to:

$$Q = C_v \sqrt{(P_{inlet} - P_{outlet})}. \quad (2)$$

Equation (2) is disclosed (using somewhat different nomenclature) by the aforementioned Lestina et al. U.S. Pat. No. 6,535,827.

The flow rate through a valve 121 is calculated using values for the valve 121's inlet pressure (measured at the valve inlet 125) and the valve 121's outlet pressure (measured at the valve outlet 126). To calculate volumetric flow rate Q through the valve, one needs to know the differential pressure, in particular how the pressure drops through the valve at various flow rates. As indicated by Equation (1), $\Delta P = P_{inlet} - P_{outlet}$ is the pressure-drop through the valve. The pressure-drop $\Delta P$ and the volumetric flow rate Q are proportional, related to each other by the proportionality constant $C_v$, which is the valve flow characteristic value.

Valve flow coefficient $C_v$ is experimentally determined for each new valve design and size by varying a known flow through the valve, and measuring the inlet pressure $P_{inlet}$ and the outlet pressure $P_{outlet}$. After data is collected, a curve can be fit to the data, thereby providing a constant multiplier, namely, valve flow coefficient $C_v$. Valve flow coefficient $C_v$ can then be used in Equation (1) to calculate the flow rate Q of a given fluid with a specific gravity S through the valve when the pressures $P_{inlet}$ and $P_{outlet}$ are measured.

A physics-based computer model predicts an outlet pressure value and a temperature value that the valve should sense, and also predicts a flow rate, which is related to the predicted outlet pressure value and the predicted temperature pressure value. An inventive smart valve unit's cooling system model may use one or more of various conventional numerical methods to calculate fluid pressures, fluid flow rates, and fluid temperatures in the vicinity of the electromechanical valve. A typical inventive embodiment provides for model calculation of the predicted flow rate using Equation (1). Moreover, each computer 111 model is provided a set of valve parameters to define the environment and the alarm limits for the valve. The following valve parameters are established according to typical embodiments of the computer model: flow characteristic value, e.g., $C_v$, wherein $C_v=1$; rupture flow tolerance, e.g., $Q_r$, in gpm; rupture pressure tolerance, e.g., $P_r$, in psi; high temperature alarm, e.g., $T_H$, in ° F.; fluid specific gravity, e.g., S, wherein S=1.

In addition, according to typical inventive practice, the heat rejected from the loads to the fluid is set as a model valve parameter, and is based on the nominal expected value from the loads vendor. Furthermore, according to typical inventive practice, a rupture criterion is established for each inventive smart valve unit. The rupture criterion is set on the basis of the pressure-versus-flow relation for a particular valve in a particular fluid-cooling piping system, and is determined during design of that system. For instance, the rupture criterion may be defined in terms of rupture flow tolerance $Q_r$ and rupture pressure tolerance $P_r$.

The inventive algorithm includes an empirical (actual) data processing component, a model (predictive) data processing component, and an empirical-versus-model comparative processing component. The inventive algorithm compares empirical data (the determination of which is represented by box "EM" in FIG. 2A) with corresponding modeled data (the determination of which is represented by box "MO" in FIG. 2A). In accordance with the present invention's control logic as typically embodied, the threshold determinations to be made are (i) whether the sensed outlet pressure is "equivalent" to the predicted outlet pressure, (ii) whether the sensed (sensed and calculated) flow rate is "equivalent" to the predicted flow rate, and (iii) whether the sensed temperature is "equivalent" to the predicted temperature.

As typically embodied according to inventive practice, the model defines the predicted values in terms of "error bands" that are based on acceptable deviations from predicted singular values. Each predictive pressure or predictive temperature actually represents an error band, that is, some mathematical (e.g., statistical) form of deviational range based on a specific predicted value and an acceptable deviation therefrom, e.g., plus-and-minus the predicted value. Typical inventive practice does not demand strict equality of empirical data to model data, but deems acceptable any empirical data that is encompassed by the inventive model's predictive range of values corresponding thereto.

If neither the sensed pressure nor the sensed flow rate nor the sensed temperature departs from the inventive algorithm's corresponding error band, then the inventive algorithm deems this state of affairs to indicate that no problem exists. On the other hand, if either the sensed pressure or the sensed flow rate or the sensed temperature departs from the inventive algorithm's corresponding error band, then the inventive algorithm deems this state of affairs to indicate that a problem exists, and proceeds to a subsequent stage of its algorithmic processing.

A statement herein that an empirical value is "equivalent" to a predictive (modeled) value conveys that the empirical value falls within an acceptable range of values; conversely, a statement herein that an empirical value is "not equivalent" (or is "nonequivalent") to a predictive value conveys that the empirical value falls outside an acceptable range of values. The term "equivalency," as used herein in describing inventive algorithmic practice, means "matching," that is, implies acceptability by virtue of equality, consistency, or comparability. According to typical inventive practice, to say that an empirical value is "equivalent" to or matches a predictive value is to say that the empirical value is encompassed by an acceptable range of values as delimited by the predictive value.

By way of example, according to various inventive embodiments, "equivalence" may be defined by any or all of the following: An empirical outlet pressure is "equivalent" to a predictive outlet pressure if the empirical outlet pressure is encompassed by the error band delimited by the predictive outlet pressure. An empirical temperature is "equivalent" to a predictive temperature if the empirical outlet pressure is encompassed by the error band delimited by the predictive temperature. An empirical flow rate is "equivalent" to a predictive flow rate if the empirical outlet pressure is encompassed by the error band delimited by the predictive flow rate. An empirical rupture tolerance (discussed hereinbelow) is "equivalent" to the empirical rupture tolerance if the empirical rupture tolerance does not fall below the predictive rupture tolerance, or if the empirical rupture tolerance does not fall below the error band delimited by the predictive rupture tolerance.

The inventive algorithm's rupture criterion is applied if the actual outlet pressure and/or the actual flow rate is/are aberrant. In other words, if either the sensed pressure or the sensed flow rate, or both, depart(s) from the inventive algorithm's corresponding error band, then the inventive algorithm considers whether the rupture criterion are met, and decides what to do based on that consideration, as illustrated in FIG. 2C. According to typical inventive practice, determination of whether the rupture criterion is met involves consideration of what is referred to herein as a "rupture determinant," that is, a quantity that is indicative of whether a pipe rupture exists in fluid piping system 200.

Inventive practice typically provides for a "set-point" rupture determinant, established by the inventive algorithm's model and representing a threshold value delimiting a rupture condition for a particular valve. The empirical pressures (inlet and outlet) and the empirical flow rate are formulaically considered together to find an empirical rupture determinant, which is compared with the model (set-point) rupture determinant. If the rupture criterion is met—that is, the empirical rupture determinant compares unfavorably with the model rupture determinant—then an alarm signal is broadcast over the valve network 300 (shown in FIG. 3 through FIG. 5), and computer 111 closes its associated valve 121. If the rupture criterion is not met—that is, the empirical rupture determinant compares favorably with the model rupture determinant—then a warning signal is broadcast over the valve network 300 to the operator console 400.

For instance, according to frequent inventive practice, the rupture determinant is rupture tolerance (rupture resistance). The terms "rupture tolerance" and "rupture resistance" (used by the aforementioned Lestina et al. '827) are used synonymously herein. The empirical rupture tolerance R value can be calculated as the empirical fluid outlet pressure $P_{outlet}$ divided by the square of the empirical flow rate Q:

$$R = P_{outlet}/Q^2 \qquad (3)$$

Equation (3) is disclosed (using somewhat different nomenclature) by the aforementioned Lestina et al. '827, which is instructive on various formulaic approaches that may be useful for inventive practice of rupture determination. Equation (3) can be inventively implemented so that, if the empirical rupture tolerance R is less than the model's set-point rupture tolerance $R_{RUPTURE}$, i.e., $R<R_{RUPTURE}$, then the rupture criterion is met.

Formulations of rupture determination other than Equation (3) may additionally or alternatively be implemented in inventive practice. According to typical inventive practice, a formulation of rupture determination that is implemented is based on outlet fluid pressure and flow rate. That is, the empirical rupture determinant and the simulative rupture determinant are based identically on outlet pressure and flow rate; the empirical rupture determinant is based on empirical outlet fluid pressure and empirical flow rate, and the simulative rupture determinant is based on simulative outlet fluid pressure and simulative flow rate.

If the rupture criterion is met, then the inventive thermal smart valvular unit 100 isolates itself (i.e., valve 121 is closed by the valve controller 111, if valve 121 is open), and transmits a "pipe rupture alarm" to the network control center (synonymously referred to herein as "network operations center") 400 via the connected communications network 300. If the rupture criterion is not met, then the inventive thermal smart valvular unit 100 transmits a "pipe rupture warning" to the network control center 400 via the connected network. Once the rupture is isolated, and/or a "rupture alarm" or "rupture warning" is received by the network control center 400 via the connected network 300, then inventive thermal smart valvular unit 100 continues to monitor flow and temperature of the cooling medium (which is usually a fluid, such as water).

In addition to comparing the empirical downstream pressure with the modeled downstream pressure and the empirical flow rate with the modeled flow rate, the inventive algorithm compares the empirical temperature with the modeled temperature. As illustrated in FIG. 3C, if the temperature is above the modeled temperature and the valve is critical, then: a close command signal is sent by the controller to the identified non-critical loads to attempt to reduce the system load, and a high temperature alarm is sent by the controller via the network to the operator console. If the temperature is above the modeled temperature and the valve is non-critical, then: the controller closes its associated valve, and a high temperature alarm is sent by the controller via the network to the operator console.

By way of elaboration, if the sensed temperature departs from the inventive algorithm's corresponding error band, then the inventive algorithm considers whether the valve is designated by the inventive algorithm's model component as being a critical-priority (vital-load) valve or a non-critical-priority (non-vital-load) valve, and decides what to do based on that consideration, as illustrated in FIG. 2B. According to typical inventive practice, non-equivalency of actual temperature to predicted temperature is manifested by a "high" actual temperature, i.e., a temperature measured to be higher than that predicted by the inventive algorithm. If an aberrant (e.g., high) temperature of the cooling fluid is detected, then the inventive thermal smart valvular unit 100 responds in one of two ways, depending on its designation as either a vital-load valve or a non-vital-load valve.

According to the first alternative response to aberrant temperature, if inventive thermal smart valvular unit 100 is set as a non-vital load, then inventive thermal smart valvular unit 100 does the following: (i) closes its valve 121 until the monitored fluid temperature drops to an acceptable level; and, (ii) transmits a "cooling-fluid high temperature alarm" to the network control center 400 via the connected network 300. According to the second alternative response to aberrant temperature, if inventive thermal smart valvular unit 100 is set as a vital load, then inventive thermal smart valvular unit 100 transmits a "cooling-fluid high temperature signal" to the network control center 400 via the connected network 300. The "cooling-fluid high temperature signal" signals one or more upstream non-vital smart valvular units 100 to close, thereby reducing thermal load on the chiller and reducing the temperature of the cooling fluids.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer program product comprising a non-transitory computer readable storage medium having a computer readable program stored thereon for execution by a first computer to perform a method for managing fluid conduction in a temperature-critical fluid system including multiple valves, each of said multiple valves associated with one of multiple computers executing said computer readable program, said first computer having a first said valve associated therewith, the method including:
   modeling said fluid system so as to represent predictive characteristics of fluid passing through each of said multiple valves in said fluid system, said predictive characteristics including a predictive fluid inlet pressure, a predictive fluid outlet pressure, a predictive fluid temperature, and a predictive flow rate;
   determining actual characteristics of fluid passing through said first valve, said actual characteristics including an actual fluid inlet pressure, an actual fluid outlet pressure, an actual fluid temperature, and an actual flow rate;
   ascertaining whether an abnormal condition exists in said fluid system with respect to said first valve, said ascertaining of whether said abnormal condition exists including comparing said actual fluid outlet pressure versus said predictive fluid outlet pressure, comparing said actual flow rate versus said predictive flow rate, and comparing said actual fluid temperature versus said predictive fluid temperature, wherein said abnormal condition is implied by at least one nonequivalent comparison of said actual characteristic versus said predictive characteristic; and
   taking remedial action if said abnormal condition is ascertained to exist with respect to said first valve, wherein the action taken includes causing closure of said first valve, or causing closure of at least one valve other than said first valve;
   communicating information pertaining to said abnormal condition to every computer, other than said first computer, with which a valve is associated in said fluid system, said communication including information of said closure;
   updating said modeling of said fluid system to account for said closure, wherein said updated modeling includes adjustment of said predictive fluid temperature of each of said multiple valves in said fluid system.

2. The computer program product of claim 1, wherein said actual flow rate is calculated based on actual fluid differential pressure, and wherein said actual fluid differential pressure equals the difference between said actual fluid inlet pressure and said actual fluid outlet pressure.

3. The computer program product of claim 2, wherein said actual flow rate is calculated as being proportional to the square root of the ratio of the actual fluid differential pressure to the specific gravity of the fluid.

4. The computer program product of claim 1, wherein said predictive characteristics include a predictive rupture determinant, and wherein if an abnormal condition is ascertained to exist as implied by nonequivalent comparison of said actual fluid outlet pressure versus said predictive fluid outlet pressure and/or as implied by nonequivalent comparison of said actual flow rate versus said predictive flow rate, then:
said actual characteristics include an actual rupture determinant;
said ascertaining of whether said abnormal condition exists includes comparing said actual rupture determinant versus said predictive rupture determinant; and
said abnormal condition is implied by nonequivalent comparison of said actual rupture determinant versus said predictive rupture determinant.

5. The computer program product of claim 4, wherein the implied said abnormal condition is a rupture.

6. The computer program product of claim 4, wherein:
said predictive rupture determinant is predictive rupture tolerance;
said predictive rupture tolerance is the ratio of said predictive fluid outlet pressure to the square of said predictive flow rate;
said actual rupture determinant is actual rupture tolerance; and
said actual rupture tolerance is the ratio of said actual fluid outlet pressure to the square of said actual flow rate.

7. The computer program product of claim 4, wherein the action taken includes said causing of closure of said first valve, if said abnormal condition is ascertained to exist as implied by nonequivalent comparison of said actual rupture determinant versus said predictive rupture determinant.

8. The computer program product of claim 4, wherein if said abnormal condition is ascertained to exist as implied by nonequivalent comparison of said actual fluid temperature versus said predictive fluid temperature;
and if said first valve is a noncritical valve, then the action taken includes causing closure of said first valve;
and if said first valve is a critical valve, then the action taken includes causing closure of at least one valve other than said first valve.

9. The computer program product of claim 8, wherein the at least one valve other than said first valve includes the nearest upstream noncritical valve.

10. A valvular network comprising plural smart valvular units that are in electronic communication with each other and that are suitable for use in a temperature-critical fluid system, each said smart valvular unit of said plural smart valvular units comprising:
a valve;
a fluid temperature sensor;
an inlet fluid pressure sensor;
an outlet fluid pressure sensor; and
a computer configured to execute computer program logic that, when executed, is capable of processing data including sensing performed by said fluid temperature sensor in the same said smart valvular unit, said inlet fluid pressure sensor in the same said smart valvular unit, and said outlet fluid pressure sensor in the same said smart valvular unit, said computer program logic being capable of processing said data so as to detect an anomalous circumstance relating to the same said smart valvular unit based on comparison between a sensory-derived value and a corresponding predicted value, initiate activity responsive to the detected anomalous circumstance relating to the same said smart valvular unit, and continually update a simulation of said fluid system, said data processable by said computer program logic including critical-versus-noncritical valve status of said valve of each said smart valvular unit in the valvular network, open-versus-closed condition of said valve of each said smart valvular unit in the valvular network, fluid temperature relating to said valve of the same said smart valvular unit, inlet fluid pressure relating to said valve of the same said smart valvular unit, and outlet fluid pressure relating to said valve of the same said smart valvular unit, wherein according to said computer program logic:
if a sensory-derived value for said outlet fluid pressure relating to said valve of the same said smart valvular unit or a flow rate relating to said valve of the same said smart valvular unit does not match a corresponding predicted value for said outlet fluid pressure relating to said valve of the same said smart valvular unit, or said flow rate relating to said valve of the same said smart valvular unit and a sensory-derived value for rupture determinant relating to said valve of the same said smart valvular unit does not match a corresponding predicted value for said rupture determinant relating to said valve of the same said smart valvular unit, then said valve of the same said smart valvular unit is closed;
if a sensory-derived value for said fluid temperature relating to said valve of the same said smart valvular does not match a corresponding predicted value for said fluid temperature relating to said valve of the same said smart valvular unit, and said valve of the same said smart valvular unit is non-critical, then said valve of the same said smart valvular unit is closed;
if a sensory-derived value for said fluid temperature relating to said valve of the same said smart valvular unit does not match a corresponding predicted value for said fluid temperature relating to said valve of the same said smart valvular unit, and said valve of said valve of the same said smart valvular unit is critical, then a nearest upstream non-critical valve of at least one different smart valvular unit of said plural smart valvular units in the valvular network is closed;
said computer program logic being further capable of:
if at least one valve of said plural smart valvular units in the valvular network is closed according to said computer program logic, updating said simulation of said fluid system to reflect said closure of said at least one valve of said plural smart valvular units in the valvular network, wherein said updating includes change of at least one said corresponding predicted values for said fluid temperature relating to said at least one valve of said plural smart valvular units in the valvular network.

11. The smart valvular unit of claim 10, wherein said flow rate is calculated as being proportional to the square root of the ratio of fluid differential pressure to the specific gravity of said fluid, the fluid differential pressure equaling the difference between said inlet fluid pressure and said outlet fluid pressure.

12. The smart valvular unit of claim 10, wherein said rupture determinant is rupture tolerance, and wherein said rupture tolerance is the ratio of said outlet fluid pressure to the square of said flow rate.

13. A method for monitoring and controlling a fluid system, the method comprising performing the following steps on a continual basis:
obtaining empirical data in association with each valve in a fluid system having multiple valves, said empirical data including an empirical fluid temperature, an empirical outlet fluid pressure, an empirical flow rate, and an empirical rupture determinant, said empirical rupture determinant being calculated based on said empirical outlet fluid pressure and said empirical flow rate;

simulating said fluid system, said simulating of said fluid system including obtaining simulative data in association with each said valve, said simulative data including a simulative fluid temperature, a simulative outlet fluid pressure, a simulative flow rate, and a simulative rupture determinant, said simulative rupture determinant being calculated based on said simulative outlet fluid pressure and said simulative flow rate;

for each said valve in said fluid system, comparing said empirical fluid temperature to said simulative fluid temperature, said empirical outlet fluid pressure to said simulative outlet fluid pressure, said empirical flow rate to said simulative flow rate, and said empirical rupture determinant to said simulative rupture determinant, wherein said empirical rupture determinant is compared to said simulative rupture determinant if: said empirical outlet fluid pressure compares nonequivalently to said simulative outlet fluid pressure; or, said empirical flow rate compares nonequivalently to said simulative flow rate;

closing a said valve in said fluid system, if: said empirical rupture determinant compares nonequivalently to said simulative rupture determinant; or, said valve is non-critical and said empirical fluid temperature compares nonequivalently to said simulative fluid temperature;

closing a said valve in said fluid system, if at least one other said valve in said fluid system is critical and said empirical fluid temperature associated with the other said valve compares nonequivalently to said simulative fluid temperature associated with the other said valve, wherein said valve being closed is upstream of and nearest to the other said valve;

upon closure of at least one said valve in said fluid system, changing said simulation of said fluid system in accordance with said closure, wherein said change of said simulation of said fluid system includes change of said simulative fluid temperature in association with at least one said valve in said fluid system.

14. The method for monitoring and controlling of claim 13, the method further comprising manifesting an alarm, if, with respect to any of said multiple valves, said empirical fluid temperature compares nonequivalently to said simulative fluid temperature, or, said empirical outlet fluid pressure compares nonequivalently to said simulative outlet fluid pressure, or, said empirical flow rate compares nonequivalently to said simulative flow rate.

* * * * *